(12) United States Patent
Zhou et al.

(10) Patent No.: US 7,720,021 B1
(45) Date of Patent: May 18, 2010

(54) METHOD AND SYSTEM FOR SETTING UP A CALL TO A MOBILE STATION VIA ANOTHER MOBILE STATION

(75) Inventors: Tong Zhou, Overland Park, KS (US); David Mohan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1016 days.

(21) Appl. No.: 11/393,058

(22) Filed: Mar. 30, 2006

(51) Int. Cl.
*H04B 7/14* (2006.01)
*H04B 7/15* (2006.01)
*H04J 1/10* (2006.01)
*H04J 3/08* (2006.01)
*H04B 7/00* (2006.01)
*H04M 1/00* (2006.01)
*H04M 11/00* (2006.01)
*H04W 40/00* (2009.01)
*H04W 4/00* (2009.01)

(52) U.S. Cl. .................. 370/315; 455/11.1; 455/41.2; 455/553.1; 455/445; 455/421; 455/422.1

(58) Field of Classification Search ............... 455/11.1, 455/421, 422.1, 445, 13.1, 417, 41.2, 41.3, 455/432.1–453, 552.1, 553.1; 370/315, 230, 370/231, 236
See application file for complete search history.

(56) References Cited

U.S. PATENT DOCUMENTS

| | | | |
|---|---|---|---|
| 5,737,703 A | 4/1998 | Byrne | |
| 5,774,461 A | 6/1998 | Hyden et al. | |
| 5,898,679 A * | 4/1999 | Brederveld et al. | 370/315 |
| 5,907,540 A * | 5/1999 | Hayashi | 370/315 |
| 6,115,762 A | 9/2000 | Bell et al. | |
| 6,205,495 B1 | 3/2001 | Gilber et al. | |
| 6,292,747 B1 | 9/2001 | Amro et al. | |
| 6,327,254 B1 | 12/2001 | Chuah | |
| 6,330,244 B1 | 12/2001 | Swartz et al. | |
| 6,438,117 B1 | 8/2002 | Grilli et al. | |
| 6,680,923 B1 | 1/2004 | Leon | |
| 7,193,987 B2 * | 3/2007 | Vilander | 370/338 |
| 7,408,948 B2 * | 8/2008 | Lopponen et al. | 370/433 |
| 2001/0036830 A1 | 11/2001 | Wu et al. | |
| 2003/0091021 A1 | 5/2003 | Trossen et al. | |

(Continued)

OTHER PUBLICATIONS

Internet Engineering Task Force ("IETF") Request for Comments ("RFCs") 768, "User Datagram Protocol," J. Postel, Aug. 1980.

(Continued)

*Primary Examiner*—George Eng
*Assistant Examiner*—Wesley L Kim

(57) ABSTRACT

A method for a setting up a call to a mobile station using an intermediary mobile station. The intermediary mobile station is a multi-mode device that may exchange data according to at least two different protocols. One protocol is a cellular communication protocol, such as CDMA. A second protocol is a WLAN protocol, such as 802.11. When a RAN attempts to setup a call with a first mobile station and the call attempt fails, the RAN establishes a cellular wireless link with the intermediary mobile station instead, and the intermediary mobile station establishes a WLAN link with the first mobile station. Call setup and bearer communication may then proceed between the RAN and the first mobile station with the intermediary mobile station functioning as a wireless bridge.

19 Claims, 3 Drawing Sheets

U.S. PATENT DOCUMENTS

| | | | |
|---|---|---|---|
| 2004/0185845 A1* | 9/2004 | Abhishek et al. | 455/422.1 |
| 2004/0236850 A1* | 11/2004 | Krumm et al. | 709/224 |
| 2004/0264410 A1 | 12/2004 | Sagi et al. | |
| 2005/0085257 A1 | 4/2005 | Laird et al. | |
| 2006/0056440 A1 | 3/2006 | Khartabil | |
| 2007/0091830 A1 | 4/2007 | Coulas et al. | |
| 2007/0111743 A1 | 5/2007 | Leigh et al. | |
| 2009/0054070 A1* | 2/2009 | Gallagher et al. | 455/445 |

OTHER PUBLICATIONS

Internet Engineering Task Force ("IETF") Request for Comments ("RFCs") 791, "Internet Protocol DARPA Internet Program Protocol Specification," Information Sciences Institute, Sep. 1981.

Internet Engineering Task Force ("IETF") Request for Comments ("RFCs") 793, "Transmission Control Protocol DARPA Internet Program Protocol Specification," Information Sciences Institute, Sep. 1981.

Internet Engineering Task Force ("IETF") Request for Comments ("RFCs") 2002, "IP Mobility Support," C. Perkins, Oct. 1996.

Internet Engineering Task Force ("IETF") Request for Comments ("RFCs") 2003, "IP Encapsulation within IP," C. Perkins, Oct. 1996.

Internet Engineering Task Force ("IETF") Request for Comments ("RFCs") 2004, "Minimal Encapsulation within IP," C. Perkins, Oct. 1996.

Internet Engineering Task Force ("IETF") Request for Comments ("RFCs") 2005, "Applicability Statement for IP Mobility Support," J. Solomom, Oct. 1996.

"802.11b and 3G Synergies for 2002," 802.11 Insights, http://www.80211-planet.com/columns/article/0,4000,1781_950811,00.html, printed Feb. 22, 2002.

"E-200 Cassiopeia Pocket PC 2002," Casio, http://www.casio.com/personalpcs/product.cfm?section=19&product=4146, printed Feb. 22, 2002.

"Making Notebooks Truly Mobile," T Techtv, http://www.techtv.com/freshgear/products/story/0,23008,3347281,00.html., printed Feb. 25, 2002.

"Product Description," WeRoam, http://www.weroam.com/, printed Feb. 25, 2002.

"Roaming Between WLAN and GSM Networks to Become Easier," thinkmobile, http://www.thinkmobile.com/laptops/news/00/48/33/, printed Feb. 25, 2002.

U.S. Appl. No. 10/200,263, filed Jul. 22, 2002 entitled "Wireless Bridge For Interfacing An 802.11 Network With A Cellular Network."

U.S. Appl. No. 11/455,602, filed Jun. 19, 2006 entitled "Method And System For Setting Up A Conference With A Mobile Station Via Another Mobile Station."

Office Action from U.S. Appl. No. 11/455,602, dated Aug. 18, 2009.

* cited by examiner

METHOD AND SYSTEM FOR SETTING UP A CALL TO A MOBILE STATION VIA ANOTHER MOBILE STATION

FIELD OF THE INVENTION

The present invention relates to wireless communications and, more particularly, to call setup through an intermediary mobile station.

BACKGROUND

In wireless communication systems, there are a variety of reasons why a radio access network (RAN) may be unable to set up a call session with a mobile station. One of the most common reasons is that the mobile station may be out of coverage of the RAN. Another reason is that the RAN may have insufficient air interface resources to engage in call control signaling with the mobile station, such as to receive an origination message, send a page message, or the like. Still other examples may exist as well.

Although a call setup failure may occur, it does not necessarily mean that a mobile station is unavailable. Given the number of wireless local area networks (e.g., 802.11, BLUETOOTH, or other networks) that are in use today, a mobile station may often be within the coverage range of a particular WLAN and may be able to place and receive calls via WLAN communication. For instance, it is known today for a mobile station to be able to telephone connectivity via an 802.11 Wi-Fi access point. To provide such connectivity, the access point can be connected with a packet-switched network, and a media gateway system can then be provided as an interface between the packet-switched network and a traditional telephone system such as the public switched telephone network (PSTN). The mobile station can then place and receive telephone calls via a communication path comprising (i) an air interface connection with the access point, (ii) the packet-switched network, (iii) the media gateway system, and (iv) the PSTN or other telephony system.

In addition to being able to gain telephone connectivity via a WLAN access point, also known today are multi-protocol mobile stations (multi-mode devices). Such multi-mode devices are designed to exchange data wirelessly in accordance with more than one protocol. For example, one protocol may be a wireless wide area network (WWAN) protocol such as CDMA, TDMA, AMPS, or GSM, and the other protocol might be a WLAN protocol such as 802.11 or BLUETOOTH. If communication according to one protocol is not available for some reason, the device may then communicate via the other protocol instead.

SUMMARY

The present invention is directed to a method and system for setting up a call to a mobile station via another mobile station.

In one scenario, a RAN receives a request to set up a call with a first mobile station (e.g., a wireless handheld device such as a cell phone or wireless PDA). In response to the request, the RAN then attempts to set up the call directly over an air interface with the first mobile station. However, the attempted direct call setup with the first mobile station fails. When that happens, the RAN then instead indirectly sets up the call with the first mobile station by establishing communication over a first wireless link with a second mobile station (also e.g., a wireless handheld device such as a cell phone or wireless PDA), and having the second mobile station extend the call via a second wireless link to the first mobile station. More particularly, the second mobile station functions as a wireless bridge or intermediary between the RAN and the first mobile station, thus allowing the call to proceed.

In the preferred embodiment, the first wireless link is a cellular link (such as a CDMA, TDMA, AMPS, or GSM link) and preferably a cellular packet-data link (e.g., a 1xRTT or 1xEV-DO link), and the second wireless link is a WLAN link (such as an 802.11 or BLUETOOTH link). However, the first and second links can take various other forms now known or later developed. Further, the first and second can theoretically also use the same air interface protocol as each other.

In practice, this process may be triggered by the RAN receiving a call setup message seeking setup of a call to the first mobile station. The call setup message could be a legacy call setup message, such as an ISUP IAM message, or the call setup message could be a packet-based call setup message, such as a SIP INVITE message. When the RAN receives the call setup message, the RAN may then attempt to page the first mobile station, but the page attempt (or more generally the call setup effort) may fail for one reason or another. In response, the RAN may then page the second mobile station over the first wireless link and, through special coding in the page message for instance, cause the second mobile station to establish communication with the first mobile station over the second wireless link. With the first wireless link (between the RAN and the second mobile station) and the second wireless link (between the second mobile station and the first mobile station) established, the RAN may communicate with the first mobile station via the second mobile station, to set up the call to the first mobile station.

In one scenario, if the call setup message that arrived at the RAN was a legacy call setup message, the RAN may employ a Session Initiation Protocol (SIP) client to engage in SIP signaling with the first mobile station, via the second mobile station, so as to extend the call over a Real-time Transport Protocol (RTP) leg, via the second mobile station, to the first mobile station. In another scenario, if the call setup message that arrived at the RAN was a SIP INVITE message, the RAN may simply pass that INVITE message, via the second mobile station, to the first mobile station, and additional SIP messaging may occur in a similar manner to set up the end-to-end call.

In one respect, an exemplary embodiment of the invention may thus take the form of a method that involves (i) receiving into a radio access network (RAN) a request to set up a call to a first mobile station, (ii) responsive to the request, the RAN paging the first mobile station and encountering a call setup failure, and (iii) responsive to the call setup failure, the RAN setting up the call to the first mobile station via a second mobile station.

In this regard, the act of paging the first mobile station and encountering the call setup failure may involve wirelessly transmitting one or more page messages to the first mobile station and detecting absence of a page response from the first mobile station.

Further, the act of setting up the call to the first mobile station via a second mobile station may involve (i) establishing a first wireless link between the RAN and the second mobile station, (ii) directing the second mobile station to enter a wireless-bridge mode in which the second mobile station bridges the first wireless link with a second wireless link to the first mobile station, and (iii) exchanging call setup messages between the RAN and the first mobile station via a communication path comprising the first wireless link and the second wireless link.

In turn, the act of directing the second mobile station to enter the wireless-bridge mode may involve including a bridge-indicator signal in a page message transmitted to the second mobile station when setting up the first wireless link. The bridge-indicator may, for instance, include a service option code that is interpretable by the second mobile station as a bridge-indicator, i.e., as a directive to function as a bridge in accordance with the process described herein.

In response to detecting the bridge-indicator, the second mobile station may then enter a wireless-bridge mode, such as by beginning to broadcast a service set identifier (SSID) for receipt by the first mobile station. And the second mobile station may then receive an association request from the first mobile station after the first mobile station detects the broadcast SSID. In one implementation, the first mobile station may begin to scan for the SSID in response to detecting a lack of a sufficient signal from the RAN (e.g., if its received signal strength from the RAN falls below a designated threshold level). Thus, when the first mobile station is out of coverage of the RAN, the first mobile station may begin to scan for the SSID. And when the SSID is being broadcast, possibly in response to the second mobile station detecting the bridge-indicator provided by the RAN, the first mobile station may detect the SSID and may then associate with the second mobile station, perhaps using well known 802.11 association techniques, thus establishing the second wireless link.

In this or other embodiments, the call setup messages may comprise SIP messages. In one scenario, as noted above, the request received by the RAN may be a SIP INVITE message destined to the first mobile station. In that case, the act of exchanging call setup messages between the RAN and the first mobile station via the communication path may involve (i) transmitting the SIP INVITE message from the RAN over the first wireless link to the second mobile station, for transmission of the SIP INVITE in turn from the second mobile station over the second link to the first mobile station, and (ii) receiving into the RAN a SIP OK message transmitted from the first mobile station to the second mobile station over the second wireless link and then from the second mobile station to the RAN over the first wireless link. Thus, the second mobile station may function as a bridge, receiving the SIP INVITE message and broadcasting the SIP INVITE over the second link for receipt by the first mobile station, and receiving the 200 OK over the second link and forwarding it along the first link to the RAN.

In practice, the RAN may select the second mobile station (to use as a bridge for the call to the first mobile station) by referring to a profile record for the first mobile station. For instance, the RAN may include a visitor location register (VLR) that contains service profile records for each of the mobile stations currently operating in the coverage of the RAN, and the VLR may include a profile record for the first mobile station indicating that the RAN should use (or attempt to use) one or more particular second mobile stations as wireless bridges when attempting to set up a call to the first mobile station. In a manner well known in the art, a mobile station's profile can be provisioned in advance (e.g., by a user or administrator via a web interface), stored in a home location register (HLR), and downloaded to the RAN's VLR when the mobile station enters coverage of the RAN.

In another respect, an exemplary embodiment of the invention may take the form of a system that includes (i) a RAN operable to provide mobile stations with access to one or more transport networks, (ii) a first mobile station operable to be served by the RAN, and (iii) a second mobile station also operable to be served by the RAN. The RAN may receive a request to set up a communication session to the first mobile station, and the RAN pages the first mobile station in an effort to set up the session. If the RAN encounters a call setup failure when attempting to set up the communication session to the first mobile station, however, the RAN may then responsively sets up the session to the first mobile station via the second mobile station, in the manner described above for instance.

These as well as other aspects, advantages, and alternatives, will become apparent to those of ordinary skill in the art by reading the following detailed description, with reference where appropriate to the accompanying drawings. Further, it should be understood that the foregoing summary, like the other description provided below, is intended to illustrate the invention by way of example only and not by way of limitation.

DETAILED DESCRIPTION

1. Wireless Communication System

Figure 1:
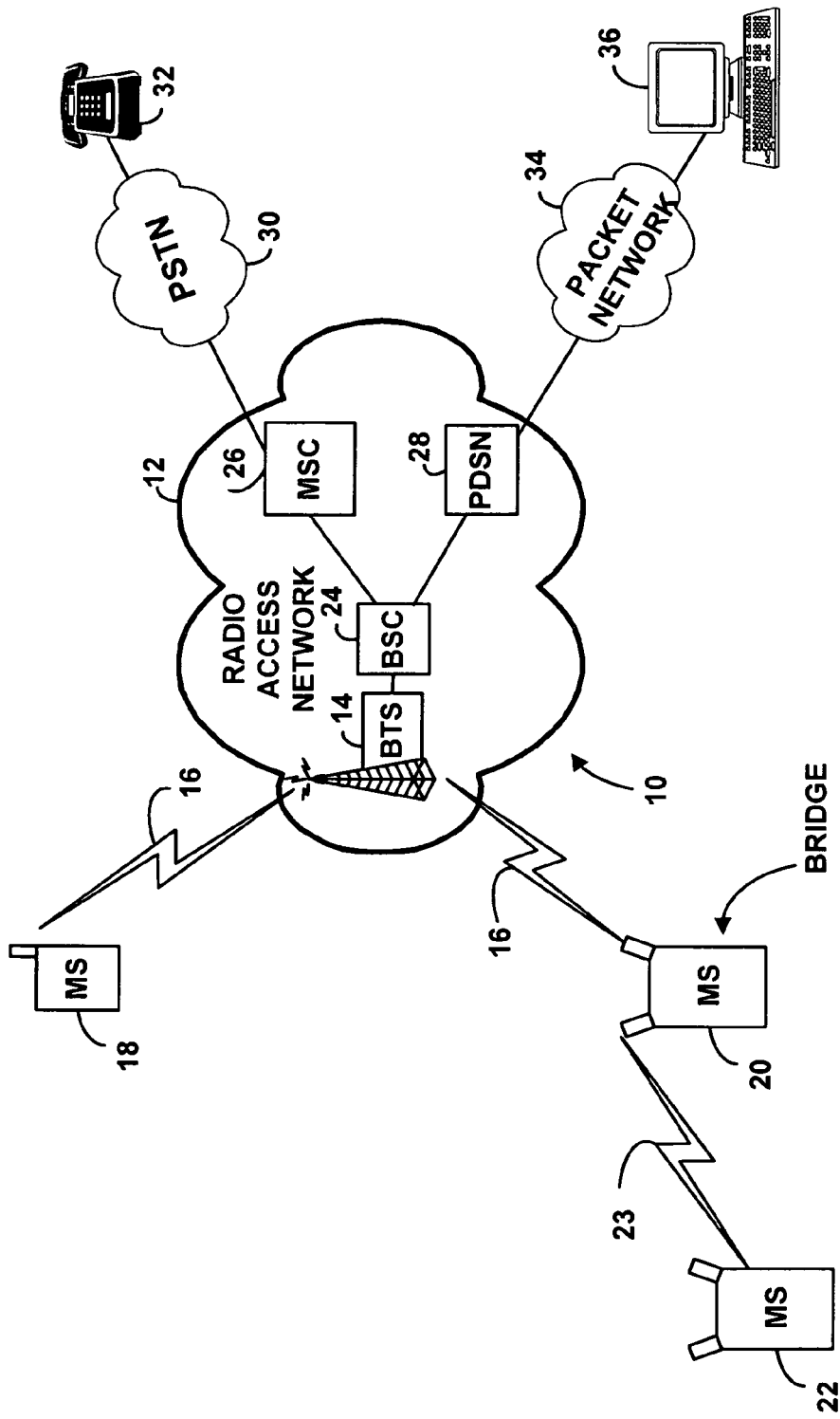
FIG. 1 is a simplified block diagram of a communication network in which examples of the present invention can be implemented.

Referring to the drawings, FIG. 1 is a simplified block diagram of an exemplary wireless communication system 10. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location, and by hardware, firmware, and/or software (e.g., one or more processors programmed with machine language instructions to carry out the functions described).

Exemplary system 10 includes at its core a radio access network (RAN) 12, which provides connectivity between one or more mobile stations and one or more transport networks. RAN 12 includes a base transceiver station (BTS) 14 (e.g., a Motorola SC4812, SC611, SC614 or SC4850) that radiates to produce a cellular air interface coverage area 16 in which mobile stations can operate. (As used herein, the term "cellular" contemplates WWAN technology such as CDMA, TDMA, AMPS, GSM, or other such technologies now known or later developed.) FIG. 1 depicts three mobile stations (shown as cellular telephones) 18, 20, and 22. In an exemplary embodiment, mobile stations 20 and 22 are multi-mode devices (described with reference to FIG. 2) that include Wi-Fi access point functionality. (As used herein, the term "Wi-Fi" contemplates any WLAN communication technology now known or later developed.) Mobile stations 20 and 22 may, therefore, communicate, or exchange data via both Wi-Fi and cellular communication.

Mobile stations 18 and 20 are positioned in coverage area 16. Mobile station 22, on the other hand, is positioned outside of coverage area 16 but within a Wi-Fi coverage area 23 produced by the Wi-Fi access point functionality of mobile station 20. This Wi-Fi coverage area can effectively increase the range of system 10 in accordance with the exemplary embodiment. For instance, when RAN 12 cannot establish connectivity with mobile station 22 using a cellular link of coverage area 16, it may extend its range by establishing a cellular link with mobile station 20 and having mobile station 20 bridge the call to mobile station 22 via a Wi-Fi link of coverage area 23. Various bridging examples will be described below.

Within the exemplary RAN 12, the BTS 14 is coupled with a base station controller (BSC) 24 (e.g., a Nortel BSS or a Motorola CBSC), which is then coupled with a mobile switching center (MSC) 26 (e.g., a Lucent 5ESS) and a packet data serving node (PDSN) 28 (e.g., a Nortel Shasta 5000 or a UTStarcom Total Control 1000). The MSC 26 provides connectivity with the public switched telephone network (PSTN) 30, which may connect with a remote telephone device 32. And the PDSN 28 provides connectivity with a packet-switched network 34, which may connect with a remote computer 36.

With this arrangement, a mobile station can be arranged to communicate with remote telephone device 32 through a communication path comprising air interface 16, BTS 14, BSC 24, MSC 26 and PSTN 30. Further, a mobile station can be arranged to communicate with remote computer 36 through a communication path comprising air interface 16, BTS 14, BSC 24, PDSN 28 and packet-switched network 34. Additionally, in both of these scenarios, when appropriate, a communication path may further comprise a Wi-Fi link for maintaining connectivity between RAN 12 and a mobile station.

Note that many variations on the system of FIG. 1 are possible. For example, although the figure shows only one BTS, one BSC, one MSC and one PDSN, system 10 could include multiples of these entities. That is, an MSC and/or PDSN could serve one or more BSCs, each BSC could serve one or more BTSs, and each BTS could radiate to provide one or more coverage areas. As another example, the functional components of RAN 12 could be combined together in various ways. For instance, BTS 14 and BSC 24 could be combined together, and/or BSC 24 and MSC 26 could be combined together. As still another example, one or more of the functional components shown in the figure could be omitted altogether.

And as yet another example, although each mobile station is shown in FIG. 1 as a cellular telephone, RAN 12 could equally serve other sorts of mobile stations as well, such as wirelessly-equipped personal digital assistants (PDAs), or wirelessly-equipped personal computers, for instance. Further, note that "mobile station" is a term of art that can encompass any wireless communication device, regardless of whether the device is easily movable (e.g. portable) or is located in a fixed position.

When a mobile station powers on or otherwise enters the coverage area of RAN 12, the mobile station may first register with the RAN. To do so, the mobile station may send a registration message over an air interface access channel to the RAN, providing the RAN with an identification of the mobile station, such as a mobile identification number (MIN), a network access identifier (NAI), and/or electronic serial number (ESN) and other information. The RAN may then authenticate and authorize the mobile station. Further, the RAN may obtain a copy of the mobile station's service profile from a home location register (not shown) and store the profile in a visitor location register (VLR)(not shown) for later reference.

Once the mobile station is registered, the mobile station may then originate outgoing communications via the RAN and receive incoming communications via the RAN. For instance, the mobile station may place a call via PSTN 30 to remote telephone 32, and the mobile station may receive a call via PSTN 30 from remote telephone 32. Further, the mobile station may acquire an IP address for communication on packet-switched network 34 and use that IP address to exchange packet-data with remote computer 36. In most instances, the mobile station will retain its IP address even if it moves outside of coverage range 16.

To originate a call over the PSTN, the mobile station may send an origination message over an air interface access channel to the RAN, providing dialed digits indicative of the called party. In one example, the origination message will pass to the MSC 26, and the MSC will responsively set up the call over the PSTN to the called party, such as by engaging in ISUP signaling with a switch serving the other party. Further, the MSC 26 will instruct the BSC 24 to assign an air interface traffic channel for use by the mobile station, and the BSC 24 will do so.

On the other hand, when a call for the mobile station comes in to the RAN from the PSTN, the RAN will page the mobile station over an air interface paging channel in order to determine whether the mobile station is available to take the call. For instance, the MSC 26 may receive an ISUP IAM call setup message from a remote switch seeking to set up a call to the mobile station, and the MSC may responsively direct the BSC 24 to page the mobile station. In response, the BSC 24 may then send a general page message, via BTS 14, over the paging channel for receipt by the mobile station. The general page message would typically carry an identifier of the mobile station, such a MIN, so that the mobile station can determine that the page message is for the mobile station.

If the mobile station receives the page message, the mobile station may then send a page response message over an air interface access channel to the RAN. And the BSC or BTS may then send a traffic channel assignment message to the mobile station, directing the mobile station to engage in the call on a particular air interface traffic channel. Further, the RAN may then direct the mobile station to alert a user of the incoming call. When the user answers the call, such as by pressing a "TALK" button, the call may then proceed over the assigned air interface traffic channel.

Alternatively, if the mobile station does not respond to the page message after a certain period of time, the RAN may try paging the mobile station again. This paging may occur a designated number of times (one or more times), after which the RAN may conclude that the page has failed. More generally, a call setup failure can occur in other ways, e.g., at other stages of the process.

To engage in packet-data communication, on the other hand, the mobile station would first acquire both a radio link (i.e., a traffic channel) via air interface 16 and a data link via PDSN 28. To do this, the mobile station may send an origination message to the RAN, including in the origination message a packet-data service option code. Upon receipt of the origination message bearing that service option code, the MSC may then instruct the BSC to process the origination, and the BSC may responsively assign a traffic channel for use by the mobile station and may signal to the PDSN 28 to facilitate setup of packet-data connectivity. The PDSN 28 and mobile station may then negotiate to establish a data link layer connection, such as a point-to-point protocol (PPP) session for instance, and the PDSN or other network entity may assign an IP address for the mobile station to use on packet-switched network 34. (Other mechanisms for acquiring wireless packet data connectivity are also known and can be used instead. For instance, in an evolution data only (EvDO) based RAN, a radio network controller (RNC) may operate in a manner analogous to a BSC.)

Once the mobile station acquires packet-data connectivity, the mobile station may then send and receive packet-data via the PDSN 28 and the packet-switched network 34, to communicate with other packet network nodes, such as remote computer 36 for instance. By way of example, assuming the mobile station is programmed with SIP client logic and RTP client logic, the mobile station could engage in SIP signaling with the remote computer to set up an RTP session through which the mobile station and remote computer could exchange real-time packet-based communications such as voice or video. Other examples are possible as well.

When a mobile station has a radio link and a data link, the mobile station is considered to be in an "active" state. After a certain period of time during which no packet-data flows to or from the mobile station, however, the BSC 24 may release the traffic channel that had been assigned to the mobile station, which would put the mobile station in a "dormant" state. In the dormant state, the mobile station would lack a radio link, but it would still have a data link via packet network 34. Thus, the mobile station may still seek to send packet-data to other entities on the packet-switched network, and other entities on the packet-switched network may still seek to send packet-data to the IP address of the mobile station.

In the dormant state, if the mobile station seeks to send packet-data, the mobile station would first send an origination message to the RAN, and the BSC would responsively assign a traffic channel for use by the mobile station via the BTS, thereby putting the mobile station in the active state. The mobile station may then send the packet-data over that traffic channel and via the RAN onto the packet-switched network.

Similarly, when the mobile station is in the dormant state, if another entity on the packet-switched network 34 seeks to send packet-data to the IP address of the mobile station, the packet-data would arrive at the PDSN 28 and flow to the BSC 24. Because the mobile station would lack a radio link over which the BSC could send the incoming packet-data, the BSC would then carry out a process much like that described above to allocate a radio link to the mobile station. For instance, the BSC may page the mobile station and, if successful, receive a page response and assign a traffic channel over which the mobile station can communicate. Once the radio link is established, the BSC may then transmit the packet-data to the mobile station over that traffic channel.

2. Example Multi-Mode Device

Figure 2:
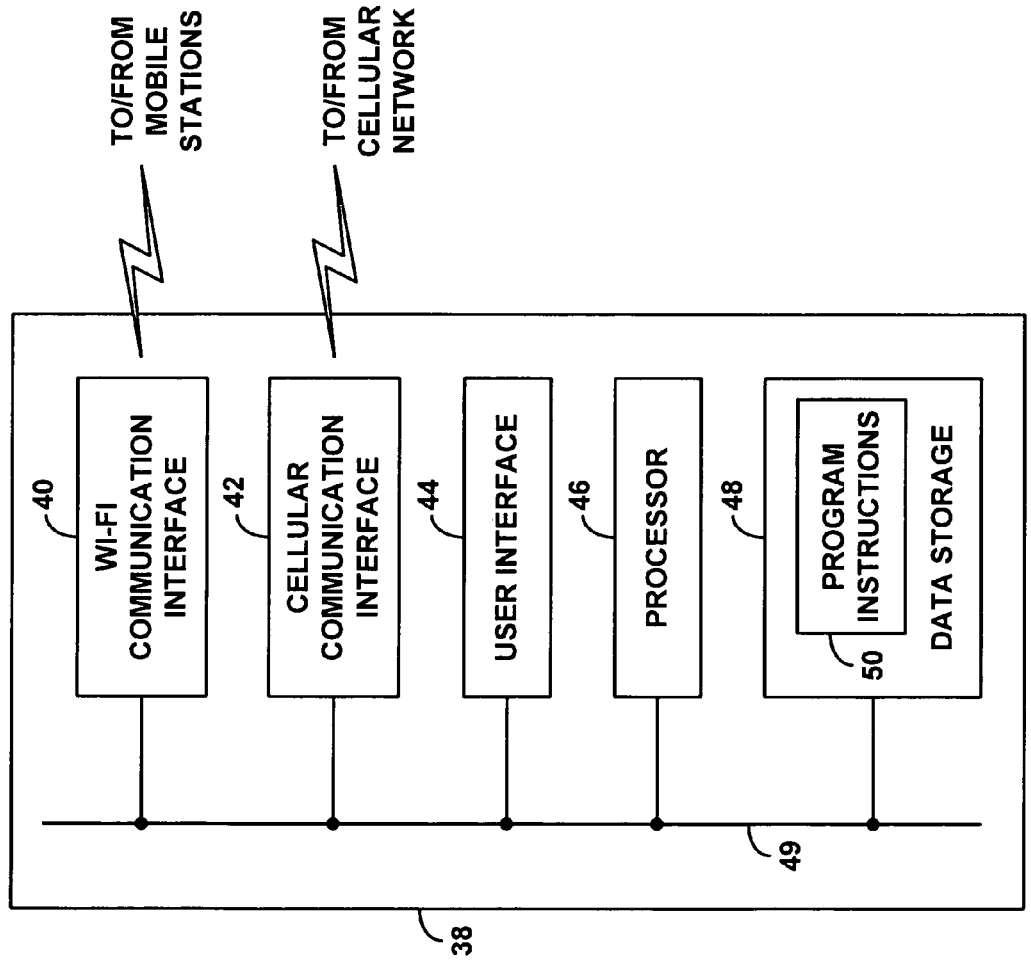
FIG. 2 is a simplified block diagram of a multi-mode device.

FIG. 2 is next a simplified block diagram showing various functional components that a multi-mode device such as either of mobile stations 20 and 22 may include in accordance with the present disclosure. As shown in FIG. 2, a multi-mode device 38 includes a Wi-Fi communication interface 40, a cellular communication interface 42, a user interface 44, a processor 46, and data storage 48, all of which are coupled together by a system bus or other mechanism 49. Although the components of multi-mode device 38 are shown within one unitary box, it should be understood that the components can instead be distributed among various physically separate entities.

Wi-Fi communication interface 40 may comprise an 802.11 chipset and antennas adapted to facilitate Wi-Fi air interface communication with other mobile stations. Wi-Fi communication interface 40 may also include a Wi-Fi based chipset that allows a mobile station to serve as a Wi-Fi access point, for example, in the same manner that portable wireless devices today can be set to function as Wi-Fi access points.

Cellular communication interface 42, similarly, may comprise a cellular chipset and antennas adapted to facilitate communication with a cellular radio access network according to a protocol such as CDMA, TDMA, AMPS, or GSM, for instance. Wi-Fi communication interface 40 and cellular communication interface 42 can be integrated in whole or in part, such as in the form of an integrated chipset and/or sharing one or more antennas.

User interface 44 preferably comprises user output components such as a display screen and audio speaker, and input components such as a keypad, touch-sensitive screen, and microphone. Further, user interface 44 preferably includes circuitry for converting between analog and digital representations of voice or media, so as to facilitate communication of such media.

Processor 46 preferably comprises one or more general purpose processors and/or special purpose processors. And data storage 48 preferably includes one or more volatile and/or non-volatile storage components (e.g., magnetic, optical, or organic components) and may be integrated in whole or in part with processor 46.

As shown, data storage 48 contains program instructions executable by processor 46 to carry out various functions described herein, whether as mobile station 20 or mobile station 22. For example, the program instructions may be executable by the processor to receive/detect from RAN 12 a page request carrying a bridge-indicator and to responsively turn on a bridge function. As another example, the program instructions may be executable by the processor to function as a Wi-Fi access point, by broadcasting an SSID via Wi-Fi interfaced 40, receiving/detecting an association request from a Wi-Fi station, authenticating and otherwise establishing a Wi-Fi station with the Wi-Fi station, and acting as a DHCP server to assign local IP addresses to Wi-Fi stations that associate with it. Further, as another example, the program instructions may be executable by the processor to function as a Wi-Fi station, by detecting an SSID broadcast from an access point, sending an association request to the access point and establishing Wi-Fi association with the access point, and sending a DHCP request to receive an IP address assignment from the access point.

And as yet another example, the program instructions may define SIP client logic for engaging in IP-based call setup signaling, such as SIP signaling, and the program instructions may define RTP client logic for facilitating RTP communication in a manner well known in the art.

3. Example RAN Element(s)

In the exemplary embodiment, the functions described herein as being carried out by the RAN can be carried out by any RAN element or by a combination of RAN elements. For instance, BTS 14, BSC 24, and/or MSC 26 may operate to (i) receive a call setup request seeking to setup a communication to mobile station 22, (ii) page mobile station 22, (iii) encounter a call setup failure, (iv) responsively select and page mobile station 20 instead, providing mobile station 20 with a bridge-indicator that causes mobile station 20 to function as a bridge, and then (v) communicate with mobile station 22 via mobile station 20. The element or elements of RAN 12 that carry out these functions may be arranged in a conventional manner but may further include stored program logic executable by a processor to carry out the various RAN functions described herein.

In the exemplary embodiment, the RAN will include or have access to profile data for each mobile station that it serves, i.e., each mobile station in its coverage area 16. The profile data for each mobile station can be conventionally maintained at a visitor location register (VLR) in the RAN, downloaded from the mobile station's home location register (HLR) when the mobile station enters coverage of the RAN.

The profile data for each mobile station may include typical service profile parameters but may further include data that identifies one or more bridge nodes that can be used when setting up calls to the mobile station. A bridge node may be another mobile station, which the service profile may identify by its MIN or in some other manner, to facilitate call setup to the bridge node.

A cellular service provider may offer the present wireless bridging service as an enhanced service for its subscribers, or particularly to subscribers who have dual mode mobile stations arranged to function in the manner presently described. In an exemplary arrangement, a subscriber may benefit from the bridging function in return for the subscriber agreeing to allow his or her mobile station to function as a bridge to benefit other subscribers. Alternatively, the service provider may charge a fee for providing the bridging service to its subscribers, or the service provider may credit subscribers in return for their agreement to have their mobile stations function as bridge nodes.

A cellular service provider may allow a subscriber to designate (or request) one or more particular mobile stations to function as bridge nodes for the subscriber's mobile station. For instance, the service provider may host a provisioning website, IVR, or operator center through which the subscriber can specify the MINs of desired bridge nodes. The service provider may then record the designated MIN(s) in the subscriber's service profile and update or load the profile onto the subscriber's HLR for downloading in turn to the VLR of RAN 12.

When seeking to set up a bridged call to a mobile station, the RAN 12 may then consult the mobile station's service profile and try to read the listed bridge node(s) in order of priority listed in the profile. Alternatively or additionally, when seeking to set up a bridged call to a mobile station, RAN 12 may search the VLR records for all mobile stations currently in its coverage and may select one such mobile station whose VLR record indicates that it is able to function as a bridge node.

4. Bridged Call Setup

Returning now to FIG. 1, as noted above, the inventive process may begin when RAN 12 receives a call setup request, seeking to set up a call to mobile station 22. The call setup request could be a request from mobile station 18 (e.g., a request to call another mobile station 22 served by the same RAN), or it could be a request that arrives via a transport network such as the PSTN 30 or the packet-switched network 34. As noted above, a call setup request from the PSTN 30 may arrive at MSC 26 in the form of an ISUP IAM message in a manner well known in the art. And a call setup request from the packet-switched network may arrive at PDSN 28 in the form of a packet-based call setup request message such as a SIP INVITE for instance, destined to the IP address of mobile station 22. Other sorts of call requests are possible as well.

When the RAN 12 receives the call setup request, it may attempt to page mobile station 22 by transmitting a general page message destined to the mobile station 22. If mobile station 22 is within coverage area 16 of RAN 12, it may successfully receive the page and engage in further signaling with RAN 12 to set up a radio link for the call, and the mobile station 22 may then engage in bearer communication via the radio link and the RAN. However, if the page fails or if the call setup effort otherwise fails for any reason, RAN 12 will then attempt a bridged call setup. In particular, RAN 12 may (i) select a bridge node such as mobile station 20, (ii) establish a first wireless link with the bridge node, and cause the bridge node to establish a second wireless link with the mobile station 22, and (iii) engage in, or facilitate, call setup signaling with mobile station 22 via the bridge node.

As noted above, to select a bridge node, RAN 12 may consult its VLR to determine whether a bridge node is specified for use in the profile of mobile station 22. If so, the RAN may attempt to use that specified bridge node. Alternatively, the RAN may consult the VLR to determine whether any other mobile station is designated as one able to function as a bridge node. Optimally, the RAN would select a bridge node that is not currently engaged in a call.

RAN 12 may apply various other criteria when selecting a bridge node to use. For instance, because a particular Wi-Fi link may have a limited range, the RAN may seek to select a bridge node that is within close range of the mobile station 22 that the RAN is trying to contact. The RAN may do so by consulting its records to determine which bridge node (or perhaps multiple specified by the VLR) is served by the same BTS, or perhaps in the same BTS sector, as mobile station 22. Alternatively, well known, more advanced location technology could be used to track the location of each potential bridge node and the last known location of the mobile station 22 at issue, and the RAN could select a bridge node closest to the last known location of the mobile station.

Once RAN 12 selects a bridge node, the RAN will then establish a cellular wireless link with the bridge node, if the cellular wireless link does not already exist. Assuming that the RAN selects mobile station 20 as the bridge node, the RAN may establish a cellular wireless link with mobile station 20 in the same manner that the RAN would normally establish a cellular wireless link with any mobile station, except that the RAN would additionally provide the presently contemplated bridge-indicator to the mobile station 20.

For example, the RAN may transmit to mobile station 20 a general page message seeking to set up a radio link with the mobile station 20. However, the RAN may include in the page message a bridge-indicator, such as a newly defined service option code, for instance, which mobile station 20 would programmatically detect as a directive for mobile station 20 to begin functioning as a bridge node if it is not functioning as one already. (In this regard, note that a given mobile station can function as a bridge node for more than one other mobile station at a time. Thus, if it is already functioning as a bridge node, the RAN can simply use it as a basis to extend a communication to another mobile station.)

Assuming mobile station 20 receives and responds to the page message, a radio link may be established. Further, in response to the bridge-indicator, mobile station 20 may turn on its Wi-Fi access point functionality and begin broadcasting a predefined SSID for detection by mobile station 22.

In the exemplary embodiment, mobile station 22 will have also detected a lack of signal from RAN 12 and will responsively have turned on its own Wi-Fi station functionality and begun scanning for the predefined SSID. Thus, mobile station 20 would optimally detect the SSID broadcast by mobile station 20 and, upon detecting the SSID, may engage in typical Wi-Fi association with mobile station 20. Note that if mobile station alternatively already has an IP address assigned by the cellular wireless system (e.g. by a mobile-IP home agent), the mobile station need not acquire a new IP address from mobile station 22.

Once the cellular link is established between the RAN and mobile station 20, and the Wi-Fi link is established between mobile station 20 and mobile station 22, call setup messages can then pass between RAN 12 and mobile station 22 via mobile station 20, so as to set up a call with mobile station 22. Further, after setup of the call, the RAN 12 may maintain a call session with mobile station 22 via mobile station 20.

5. Example Call Setup Process

Figure 3:
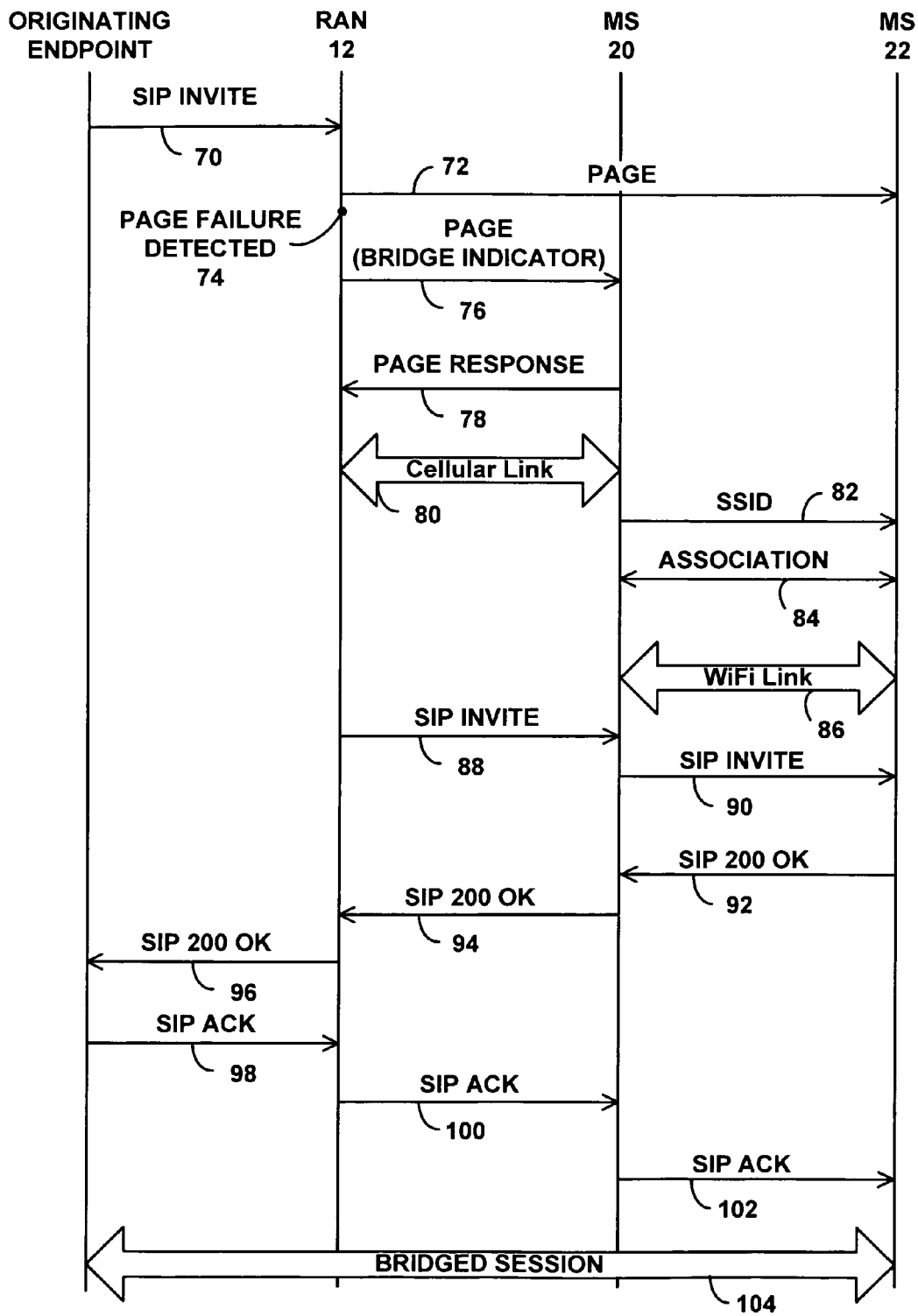
FIG. 3 is a message flow diagram depicting bridged call setup.

FIG. 3 is a call flow diagram illustrating an example of how the invention may work in practice to extend a call to mobile station 22 via mobile station 20. This example assumes that mobile station 22 is in a dormant state and thus has an IP address but no radio link. The example further assumes that an originating endpoint has transmitted a call setup request in the form of a SIP INVITE, which RAN 12 receives as packet data destined to the IP address of mobile station 22.

Referring to FIG. 3, at step 70, RAN 12 thus receives the SIP INVITE destined to the IP address of mobile station 22. Because mobile station 22 is dormant, RAN 12 then pages the mobile station 22, at step 72, in an effort to set up a radio link through which to transmit the INVITE message to the mobile station 22. Although only one page message is shown at step 72, the RAN could try paging the mobile station 22 twice or any specified number of times before concluding, as shown at point 74, that the page has failed or more generally that call setup effort has failed. This failure may occur because mobile station 22 is out of coverage or for any of a variety of other reasons.

In response to the call setup failure, RAN 12 may then programmatically select mobile station 20 to use as a bridge node for extending the call to mobile station 22. At step 76, RAN 12 then pages the selected mobile station 20 in an effort to establish a cellular radio link with mobile station 20. Further, as shown, RAN 12 includes in the page message to mobile station 20 a bridge-indicator, such as a special service option code, which directs mobile station 20 to begin functioning as a bridge node if mobile station 20 is not functioning in that manner already.

At step 78, mobile station 20 replies to RAN 12 with a page response, and the RAN and mobile station 20 engage in any further signaling necessary to establish a bearer channel between the RAN and mobile station 20. Thus, a cellular radio link 80 is thereby established between RAN 12 and mobile station 20.

Further, in response to the bridge-indicator contained in the page message at step 76, mobile station 20 begins functioning as a Wi-Fi access point to facilitate establishing a Wi-Fi link with mobile station 22. Thus, at step 82, mobile station 20 broadcasts the predefined SSID. Mobile station 22 then detects that SSID and, at step 84, mobile station 22 engages in an association process with mobile station 20. As a result, a Wi-Fi link 86 is established between mobile station 20 and mobile station 22.

Meanwhile, in response to establishment of the cellular radio link with mobile station 20, RAN 12 sends the SIP INVITE over that link to mobile station 20, at step 88. In turn, in response to establishment of the Wi-Fi link with mobile station 22, mobile station 20 sends the SIP INVITE over the Wi-Fi link (perhaps generally broadcasting it on the link, for receipt by the mobile station having the destination IP address, namely, mobile station 22), at step 90.

At this point, typical SIP signaling may then proceed between mobile station 22 and the originating endpoint, via mobile station 20 as a bridge. In particular, mobile station 22 may accept the session invitation by sending a SIP 200 OK message via Wi-Fi link 86 to mobile station 20, at step 92, which mobile station 20 then forwards by rote over cellular link 80 to RAN 12, at step 94. And RAN 12 then forwards the SIP 200 OK message over packet network 34 to the originating endpoint, at step 94. In a similar manner, a SIP ACK message then passes from the originating endpoint to RAN 12 (at step 98), from RAN 12 via cellular link 80 to mobile station 20 (at step 100), and from mobile station 20 via Wi-Fi link 86 to mobile station 22 (at step 102), thereby concluding the session setup. The session may then proceed, at step 104, between the originating endpoint and mobile station 22, via RAN 12 and mobile station 20 as a bridge node.

6. Conclusion

An exemplary embodiment of the present invention has been described above. Those skilled in the art will understand, however, that changes and modifications may be made to this embodiment without departing from the true scope and spirit of the present invention, which is defined by the claims.

For example, although the foregoing description focuses on bridging a cellular wireless link to a WLAN link, including CDMA packet-data link for the cellular link and 802.11 for the WLAN link, the invention can be extended to include bridging a variety of wireless networks. In addition a variety of different types of intermediary, bridging devices may be used. Such devices include cell phones, wireless handheld devices, laptops, etc.

Further, although the foregoing discusses setup of a call destined to a mobile station via a bridging mobile station, the invention could extend as well to facilitate setup of a call from a mobile station via a bridging mobile station. Still further, it should of course be understood that the term "call" as used herein generally refers to any sort of communication session.

Other examples are possible as well.

We claim:

1. A method comprising:
receiving into a radio access network (RAN) a request to set up a call to a first mobile station;
responsive to the request, the RAN paging the first mobile station and encountering a call setup failure; and
responsive to the call setup failure, the RAN setting up the call to the first mobile station via a second mobile station,
wherein the RAN setting up the call to the first mobile station via the second mobile station comprises (i) the RAN establishing a first wireless link between the RAN and the second mobile station, (ii) the RAN sending to the second mobile station a bridge-indicator that directs the second mobile station to enter a wireless-bridge mode in which the second mobile station broadcasts a service set indicator (SSID) that the first mobile station is arranged to begin scanning for in response to the first mobile station detecting lack of sufficient wireless coverage from the RAN, and (iii) the RAN engaging in setup signaling with the first mobile station via a path comprising the first wireless link between the RAN and the second mobile station and a second wireless link that is established between the second mobile station and the first mobile station after the first mobile station detects the SSID broadcast by the second mobile station and associates with the second mobile station.

2. The method of claim 1, wherein paging the first mobile station and encountering the call setup failure comprises wirelessly transmitting one or more page messages to the first mobile station and detecting absence of a page response from the first mobile station.

3. The method of claim 1, wherein sending the bridge-indicator to the second mobile station comprises including the bridge-indicator in a page message transmitted to the second mobile station when setting up the first wireless link.

4. The method of claim 3, wherein including the bridge-indicator comprises including a service option code interpretable by the second mobile station as a bridge-indicator.

5. The method of claim 1, wherein, in the wireless-bridge mode, the second mobile station bridges the first wireless link with the second wireless link.

6. The method of claim 1, further comprising the second mobile station receiving an association request from the first mobile station after the first mobile station detects the broadcast SSID.

7. The method of claim 1, wherein the RAN engaging in setup signaling with the first mobile station comprises exchanging call setup messages between the RAN and the first mobile station via a communication path comprising the first wireless link and the second wireless link, and wherein the call setup messages comprise Session Initiation Protocol (SIP) messages.

8. The method of claim 7, wherein the request received by the RAN comprises a SIP INVITE message destined to the first mobile station, and wherein exchanging call setup messages between the RAN and the first mobile station via the communication path comprises:
    transmitting the SIP INVITE message from the RAN over the first wireless link to the second mobile station, for transmission of the SIP INVITE in turn from the second mobile station over the second link to the first mobile station; and
    receiving into the RAN a SIP OK message transmitted from the first mobile station to the second mobile station over the second wireless link and then from the second mobile station to the RAN over the first wireless link.

9. The method of claim 8, further comprising:
    receiving the SIP INVITE message into the second mobile station, and broadcasting the SIP INVITE over the second wireless link, for receipt by the first mobile station.

10. The method of claim 1, wherein the first wireless link comprises a cellular wireless link, and wherein the second wireless link comprises a wireless local area network (WLAN) link.

11. The method of claim 10, wherein the first wireless link comprises a CDMA packet-data link, and wherein the second wireless link comprises an 802.11 link.

12. The method of claim 1, wherein the first mobile station comprises a wireless handheld device, and wherein the second mobile station comprises a wireless handheld device.

13. The method of claim 1, wherein at least the second mobile station comprises a cell phone.

14. The method of claim 1, further comprising selecting the second mobile station in accordance with a profile record for the first mobile station.

15. The method of claim 1, wherein the RAN engaging in setup signaling with the first mobile station comprises exchanging call setup messages between the RAN and the first mobile station via a communication path comprising the first wireless link and the second wireless link.

16. A system comprising:
    a radio access network (RAN) operable to provide mobile stations with access to one or more transport networks;
    a first mobile station operable to be served by the RAN; a second mobile station operable to be served by the RAN;
    wherein, when the RAN receives a request to set up a communication session to the first mobile station, the RAN pages the first mobile station in an effort to set up the session; and
    wherein, if the RAN encounters a call setup failure when attempting to set up the communication session to the first mobile station, the RAN responsively sets up the session to the first mobile station via the second mobile station:
    wherein the RAN setting up the call to the first mobile station via the second mobile station comprises (i) the RAN sending to the second mobile station a bridge-indicator that causes the second mobile station to broadcast a service set indicator (SSID) that the first mobile station is arranged to begin scanning for in response to the first mobile station detecting lack of sufficient wireless coverage from the RAN, and (ii) the RAN engaging in setup signaling with the first mobile station via a path comprising a first wireless link between the RAN and the second mobile station and a second wireless link that is established between the second mobile station and the first mobile station after the first mobile station detects the SSID broadcast by the second mobile station and associates with the second mobile station.

17. The system of claim 16, wherein the RAN sets up the session to the first mobile station via the second mobile station by a process comprising establishing the first wireless link between the RAN and the second mobile station.

18. The system of claim 16, wherein at least the second mobile station comprises a cell phone.

19. A method comprising:
    receiving into a radio access network (RAN) a request to set up a call to a first mobile station;
    responsive to the request, the RAN paging the first mobile station and encountering a call setup failure; and
    responsive to the call setup failure, the RAN setting up the call to the first mobile station via a second mobile station,
    wherein setting up the call to the first mobile station via a second mobile station comprises (i) establishing a first wireless link between the RAN and the second mobile station,
    (ii) directing the second mobile station to enter a wireless-bridge mode in which the second mobile station bridges the first wireless link with a second wireless link to the first mobile station, and (iii) exchanging call setup messages between the RAN and the first mobile station via a communication path comprising the first wireless link and the second wireless link,
    wherein directing the second mobile station to enter the wireless-bridge mode comprises including a bridge-indicator in a page message transmitted to the second mobile station when setting up the first wireless link,
    wherein the method further comprises, in response to the bridge-indicator, the second mobile station entering the wireless-bridge mode, wherein entering the wireless-bridge mode comprises broadcasting a service set identifier (SSID) for receipt by the first mobile station,
    wherein the method further comprises the second mobile station receiving an association request from the first mobile station after the first mobile station detects the broadcast SSID, and
    wherein the method further comprises the first mobile station beginning to scan for the SSID in response to detecting lack of sufficient wireless coverage from the RAN.

* * * * *